United States Patent
Chen et al.

(10) Patent No.: US 11,496,063 B2
(45) Date of Patent: Nov. 8, 2022

(54) FLYBACK CONVERTER AND SWITCHING CONTROLLER CIRCUIT AND CONTROL METHOD THEREOF

(71) Applicant: Richtek Technology Corporation, Zhubei (TW)

(72) Inventors: Yu-Chang Chen, Nantou (TW); Wei-Hsu Chang, Hsinchu (TW); Kun-Yu Lin, Hsinchu (TW); Ta-Yung Yang, Taoyuan (TW)

(73) Assignee: RICHTEK TECHNOLOGY INCORPORATION, Hsinchu (TW)

( * ) Notice: Subject to any disclaimer, the term of this patent is extended or adjusted under 35 U.S.C. 154(b) by 9 days.

(21) Appl. No.: 17/356,767

(22) Filed: Jun. 24, 2021

(65) Prior Publication Data

US 2022/0006392 A1 Jan. 6, 2022

Related U.S. Application Data

(60) Provisional application No. 63/048,074, filed on Jul. 3, 2020.

(30) Foreign Application Priority Data

Feb. 2, 2021 (TW) ................................. 110103901

(51) Int. Cl.
*H02M 3/335* (2006.01)
*H02M 1/38* (2007.01)
(Continued)

(52) U.S. Cl.
CPC ...... *H02M 3/33592* (2013.01); *H02M 1/0058* (2021.05); *H02M 1/083* (2013.01); *H02M 1/38* (2013.01)

(58) Field of Classification Search
CPC ............. H02M 1/0032; H02M 1/0038; H02M 1/0048; H02M 1/0058; H02M 1/38;
(Continued)

(56) References Cited

U.S. PATENT DOCUMENTS

| 2018/0013352 A1* | 1/2018 | Cao ................... H02M 3/33592 |
| 2019/0149032 A1* | 5/2019 | Yang ..................... H02M 1/083 363/21.14 |

(Continued)

*Primary Examiner* — Gary L Laxton
(74) *Attorney, Agent, or Firm* — Tung & Associates

(57) ABSTRACT

A flyback converter includes a power transformer, a primary side switch, a secondary side switch and a controller. A secondary side switching signal has an SR pulse for achieving synchronous rectification, and a ZVS pulse for achieving zero voltage switching. The ZVS pulse is enabled according to a first characteristic of a resonance waveform, whereas, a primary side switching signal is enabled according to a second characteristic of resonance waveform. When an output current increases, the primary side switching signal is disabled during an inhibition interval, such that primary side switching signal does not overlap with the ZVS pulse, thereby preventing the primary and secondary side switches from being both conductive simultaneously. The inhibition interval is correlated with a rising edge of the primary side switching signal in a previous switching period and a resonance period of the resonance waveform.

30 Claims, 10 Drawing Sheets

(51) Int. Cl.
*H02M 1/00* (2006.01)
*H02M 1/08* (2006.01)

(58) Field of Classification Search
CPC .. H02M 1/385; H02M 3/335; H02M 3/33507; H02M 3/33569; H02M 3/33576; H02M 3/33592
See application file for complete search history.

(56) References Cited

U.S. PATENT DOCUMENTS

2020/0280263 A1\* 9/2020 Lin .................... H02M 3/33592
2021/0119526 A1\* 4/2021 Chung .............. H02M 3/33523

\* cited by examiner

FLYBACK CONVERTER AND SWITCHING CONTROLLER CIRCUIT AND CONTROL METHOD THEREOF

CROSS REFERENCE

The present invention claims priority to U.S. 63/048,074 filed on Jul. 3, 2020 and claims priority to TW 110103901 filed on Feb. 2, 2021.

BACKGROUND OF THE INVENTION

Field of Invention

The present invention relates to a flyback converter; particularly, it relates to such flyback converter capable of achieving zero voltage switching and capable of avoiding overlapping ON periods of the primary side and secondary side of the flyback converter to undesirably generate short-circuited current. The present invention also relates to a controller circuit and a control method for use in such flyback converter.

Description of Related Art

Please refer to FIG. 1A and FIG. 1B. FIG. 1A and FIG. 1B show schematic diagrams of conventional flyback converters (i.e., flyback converter 1001A and flyback converter 1001B), respectively. In the conventional flyback converters 1001A and 1001B, a primary side control circuit 80 generates a primary side switching signal S1C for controlling the primary side switch S1, so as to switch a power transformer 10, thus generating an output voltage Vo; a secondary side control circuit 90 generates a secondary side switching signal S2C for controlling the secondary side switch S2, so as to perform synchronous rectification at a secondary side of the power transformer 10 and to achieve zero voltage switching (ZVS). The configuration of the flyback converter 1001A is similar to the configuration of the flyback converter 1001B, but is different in that: the secondary side switch S2 of the flyback converter 1001A is located at a lower side with respect to a secondary winding of the power transformer 10 of the flyback converter 1001A, whereas, the secondary side switch S2 of the flyback converter 1001B is located at an upper side with respect to a secondary winding of the power transformer 10 of the flyback converter 1001B.

Please refer to FIG. 2, which illustrates a signal waveform diagram depicting the operation of conventional flyback converters of FIG. 1A and FIG. 1B. In the illustrated operation, the conventional flyback converters 1001A and 1001B operate in a discontinuous conduction mode (DCM). The secondary side switching signal S2C of the flyback converter 1001A or the flyback converter 1001B has a synchronous rectifying (SR) pulse PSR and a zero voltage switching (ZVS) pulse PZV. As shown in FIG. 2, after the primary side switch S1 is turned ON and turned OFF, the SR pulse PSR is configured to operably control the secondary side switch S2 to be ON for a duration wherein the power transformer 10 is being demagnetized, so as to achieve synchronous rectification at the secondary side of the power transformer 10. On the other hand, the ZVS pulse PZV is provided to cause the primary side switch S1 to achieve the above-mentioned zero voltage switching.

The prior art flyback converters 1001A and 1001B shown in FIG. 1A and FIG. 1B have adopt a technique of "peak/valley lock", that is, a waveform characteristic of a signal in resonance waveform (e.g., the voltage VDS1 of the primary side switch S1 in a resonance waveform when the prior art flyback converters 1001A and 1001B operate in a DCM mode) is adaptively selected according to a level of the output current, such as a specific serial number of peak when the voltage VDS1 of the primary side switch S1 is in resonance waveform (e.g., the third peak P3 in the waveform of the voltage VDS1) in a DCM mode, as an initiation time point of the above-mentioned ZVS pulse PZV. And, the primary side control circuit 80 and the secondary side control circuit 90 of the prior arts further perform synchronous rectification to synchronize a turned-ON time point of the primary side switch S1 based upon another characteristic of the above-mentioned resonance waveform, such as a valley adjacent to the peak (e.g., the fourth valley V4 in the waveform of the voltage VDS1). By doing so, the prior art flyback converters 1001A and 1001B can accordingly cause both the primary side switch S1 and the secondary side switch S2 to achieve zero voltage switching, thereby enhancing power conversion efficiency. Moreover, the prior art flyback converters 1001A and 1001B can ensure the switching timings of the primary side switch S1 and the secondary side switch S2 are synchronous with each other and their ON periods do not overlap with each other without requiring using an extra isolated communication route (e.g., a pulse transformer), to avoid resulting in short-circuited current.

However, in spite of the fact that the prior arts shown in FIG. 1A and FIG. 1B possess the above-mentioned features, the prior arts shown in FIG. 1A and FIG. 1B have the following drawbacks that: as shown in FIG. 3, under certain situation when the load condition varies, the primary side switch S1 and the secondary side switch S2 may still be ON at the same time, thus resulting in the short-circuited current. Please refer to FIG. 3, which illustrates a signal waveform diagram depicting the operation of conventional flyback converters of FIG. 1A and FIG. 1B. As shown in FIG. 3, the level of the load current Io increases during the switching period [n+1] as compared to the switching period [n]. Because the load current increases during the switching period [n+1], the primary side switching signal S1C is turned ON earlier in the switching period [n+1]. Under such circumstance, if the turned-ON timing and the ON period of a ZVS pulse PZV of the secondary side switching signal S2C are still the same as they are in the previous switching period (i.e., switching period [n]), it will cause the primary side switch S1 and the secondary side switch S2 to be ON at the same time, to result in short-circuit, which can damage the flyback converters 1001A and 1001B.

As compared to the prior arts in FIG. 1A and FIG. 1B, the present invention is advantageous in that: besides the merits that both the primary side switch S1 and the secondary side switch S2 can achieve zero voltage switching and that the switching timing of the primary side switch S1 is synchronous with the switching timing of the secondary side switch, the present invention can further effectively prevent the primary side switch S1 and the secondary side switch S2 from being simultaneously ON when the load condition varies, thus avoiding short-circuited current.

SUMMARY OF THE INVENTION

From one perspective, the present invention provides a switching controller circuit, which is configured to operably control a flyback converter, so as to convert an input power to an output power, wherein the flyback converter includes: a power transformer, which is coupled between the input power and the output power; a primary side switch, which is configured to operably control a primary winding of the power transformer; and a secondary side switch, which is configured to operably control a secondary winding of the power transformer; the switching controller circuit comprising: a primary side control circuit, which is configured to operably generate a primary side switching signal for controlling the primary side switch during a switching period; and a secondary side control circuit, which is configured to operably generate a secondary side switching signal for controlling the secondary side switch, wherein the secondary side switching signal has a synchronous rectifying (SR) pulse and a zero voltage switching (ZVS) pulse, wherein the SR pulse is configured to operably control the secondary side switch to be conductive for a SR period, so as to achieve synchronous rectification at a secondary side of the power transformer, and wherein the ZVS pulse is configured to operably control the secondary side switch to be conductive for a ZVS period, so as to cause the primary side switch to achieve zero voltage switching; wherein in a steady state, the secondary side control circuit is configured to operably enable the ZVS pulse according to a first waveform characteristic of a discontinuous conduction mode (DCM) resonance waveform, whereas, the primary side control circuit is configured to operably enable the primary side switching signal according to a second waveform characteristic of the DCM resonance waveform, wherein the second waveform characteristic of the DCM resonance waveform occurs later than the first waveform characteristic of the DCM resonance waveform; wherein in a case where the output power or an output current of the output power increases in comparison to the steady state, during a present switching period, the primary side control circuit is configured to operably enable the primary side switching signal according to a third waveform characteristic of the DCM resonance waveform, so as to prevent the primary side switch and the secondary side switch from being both conductive simultaneously, wherein an occurrence time point of the third waveform characteristic occurs later than an occurrence time point of the second waveform characteristic in the present switching period.

In one embodiment, the DCM resonance waveform corresponds to a resonance waveform of a drain-source voltage of the primary side switch, wherein the second waveform characteristic corresponds to a V-th valley of the DCM resonance waveform, whereas, the third waveform characteristic corresponds to a W-th valley of the DCM resonance waveform, wherein both V and W are integers and W is greater than V.

In one embodiment, in a case where the output power or the output current of the output power increases in comparison to the steady state, during the present switching period, the primary side control circuit is configured to operably disable the primary side switching signal during an inhibition interval, so that the primary side switching signal and the ZVS pulse do not overlap with each other during the inhibition interval, thereby preventing the primary side switch and secondary side switch from being both conductive simultaneously; wherein the inhibition interval is correlated with a rising edge of the primary side switching signal within a previous switching period and a resonance period of the DCM resonance waveform.

In one embodiment, the resonance period of the DCM resonance waveform is correlated to an inductance of the primary winding and a stray capacitance of the primary side switch.

In one embodiment, the primary side control circuit is configured to operably generate an ON control signal according to the output power, so as to trigger the primary side switching signal and determine a turned-ON time point and an ON period of the primary side switch during each switching period, wherein the primary side control circuit is configured to operably generate a pre-inhibition signal indicative of a pre-inhibition interval during each switching period; wherein when the ON control signal becomes enabled during the pre-inhibition interval, the primary side control circuit is configured to operably generate an inhibition signal indicative of the inhibition interval, so as to mask the ON control signal during the inhibition interval, thereby disabling triggering the primary side switching signal; wherein the pre-inhibition signal is generated according to the rising edge of the primary side switching signal within the previous switching period and the resonance period of the DCM resonance waveform, and wherein the pre-inhibition interval covers at least the ZVS pulse of the previous switching period.

In one embodiment, when the ON control signal becomes enabled beyond the pre-inhibition interval, the ON control signal is allowed to trigger the primary side switching signal.

In one embodiment, after the inhibition signal is enabled, the switching controller circuit counts time of the inhibition interval according to a resonance synchronization signal correlated with the resonance period, such that the inhibition interval lasts for at least one resonance period.

In one embodiment, after the inhibition signal is enabled, the switching controller circuit counts time of the inhibition interval according to a signal related to the resonance period, such that after the inhibition interval ends, the primary side switching signal is enabled at a time point when the third waveform characteristic of the DCM resonance waveform occurs, thus achieving zero voltage switching, wherein the occurrence time point of the third waveform characteristic is later than an occurrence time point of the second waveform characteristic.

In one embodiment, when the inhibition signal is enabled, during the present switching period, an enablement time point of the primary side switching signal is distant from the ZVS pulse by one and half resonance periods.

In one embodiment, the primary side control circuit includes: a ramp signal generation circuit, which is configured to operably start generating a baseline ramp signal at a knee point of the primary side switching signal during the switching period; a valley selection circuit, which is configured to operably sample and hold the baseline ramp signal at the rising edge of the primary side switching signal, so as to generate a valley memory signal, and is configured to operably generate a first ramp signal and a second ramp signal, wherein a first offset level lies between the first ramp signal and the baseline ramp signal, whereas, a second offset level lies between the second ramp signal and the baseline ramp signal; and an inhibition signal generation circuit, which is configured to operably compare the first ramp signal with the baseline ramp signal and compare the second ramp signal with the baseline ramp signal, so as to generate the pre-inhibition signal; wherein the pre-inhibition interval corresponds to a period wherein the baseline ramp signal lies between the first ramp signal and the second ramp signal, and wherein the pre-inhibition interval is configured to operably determine whether an occurrence time point of a rising edge of the ON control signal is within the pre-inhibition interval, so as to generate the inhibition signal.

In one embodiment, both the first offset level and the second offset level are correlated with the resonance period.

In one embodiment, the primary side control circuit further includes: a resonance detection circuit, which is configured to operably generate a resonance synchronization signal correlated with the resonance period according to an auxiliary signal generated by an auxiliary winding of the power transformer; wherein the inhibition signal generation circuit is further configured to operably count time of the inhibition interval according to the resonance synchronization signal, such that the inhibition interval lasts for at least one resonance period.

From another perspective, the present invention provides a flyback converter, which is configured to operably convert an input power to an output power, the flyback converter comprising: a power transformer, which is coupled between the input power and the output power; a primary side switch, which is configured to operably control a primary winding of the power transformer; a secondary side switch, which is configured to operably control a secondary winding of the power transformer; a primary side control circuit, which is configured to operably generate a primary side switching signal for controlling the primary side switch during a switching period; and a secondary side control circuit, which is configured to operably generate a secondary side switching signal for controlling a secondary side switch, wherein the secondary side switching signal has a synchronous rectifying (SR) pulse and a zero voltage switching (ZVS) pulse, wherein the SR pulse is configured to operably control the secondary side switch to be conductive for a SR period, so as to achieve synchronous rectification at a secondary side of the power transformer, and wherein the ZVS pulse is configured to operably control the secondary side switch to be conductive for a ZVS period, so as to cause the primary side switch to achieve zero voltage switching; wherein in a steady state, the secondary side control circuit is configured to operably enable the ZVS pulse according to a first waveform characteristic of a discontinuous conduction mode (DCM) resonance waveform, whereas, the primary side control circuit is configured to operably enable the primary side switching signal according to a second waveform characteristic of the DCM resonance waveform, wherein the second waveform characteristic of the DCM resonance waveform occurs later than the first waveform characteristic of the DCM resonance waveform; wherein in a case where the output power or an output current of the output power increases in comparison to the steady state, during a present switching period, the primary side control circuit is configured to operably enable the primary side switching signal according to a third waveform characteristic of the DCM resonance waveform, so as to prevent the primary side switch and the secondary side switch from being both conductive simultaneously, wherein an occurrence time point of the third waveform characteristic occurs later than an occurrence time point of the second waveform characteristic in the present switching period.

From yet another perspective, the present invention provides a control method configured to operably control a flyback converter, so as to convert an input power to an output power, wherein the flyback converter includes: a power transformer, which is coupled between the input power and the output power; a primary side switch, which is configured to operably control a primary winding of the power transformer; and a secondary side switch, which is configured to operably control a secondary winding of the power transformer; the control method comprising: generating a primary side switching signal for controlling the primary side switch during a switching period; and generating a secondary side switching signal for controlling a secondary side switch, wherein the secondary side switching signal has a synchronous rectifying (SR) pulse and a zero voltage switching (ZVS) pulse, wherein the SR pulse is configured to operably control the secondary side switch to be conductive for a SR period, so as to achieve synchronous rectification at a secondary side of the power transformer, and wherein the ZVS pulse is configured to operably control the secondary side switch to be conductive for a ZVS period, so as to cause the primary side switch to achieve zero voltage switching; wherein in a steady state, the step of generating the ZVS pulse includes a following step: enabling the ZVS pulse according to a first waveform characteristic of a discontinuous conduction mode (DCM) resonance waveform; wherein in the steady state, the step of generating the primary side switching signal includes following steps: enabling the primary side switching signal according to a second waveform characteristic of the DCM resonance waveform, wherein the second waveform characteristic of the DCM resonance waveform occurs later than the first waveform characteristic of the DCM resonance waveform; and in a case where an output power or an output current of the output power increases in comparison to the steady state, during a present switching period, enabling the primary side switching signal according to a third waveform characteristic of the DCM resonance waveform, so as to prevent the primary side switch and the secondary side switch from being both conductive simultaneously, wherein an occurrence time point of the third waveform characteristic occurs later than an occurrence time point of the second waveform characteristic in the present switching period.

In one embodiment, the DCM resonance waveform corresponds to a resonance waveform of a drain-source voltage of the primary side switch, wherein the second waveform characteristic corresponds to a V-th valley of the DCM resonance waveform, whereas, the third waveform characteristic corresponds to a W-th valley of the DCM resonance waveform, wherein both V and W are integers and W is greater than V.

In one embodiment, in a case where the output power or the output current of the output power increases in comparison to the steady state, during the present switching period, the primary side control circuit is configured to operably disable the primary side switching signal during an inhibition interval, so that the primary side switching signal and the ZVS pulse do not overlap with each other during the inhibition interval, thereby preventing the primary side switch and secondary side switch from being both conductive simultaneously; wherein the inhibition interval is correlated with a rising edge of the primary side switching signal within a previous switching period and a resonance period of the DCM resonance waveform.

In one embodiment, the step of generating the primary side switching signal further includes following steps: generating an ON control signal according to the output power, so as to trigger the primary side switching signal and determine a turned-ON time point and an ON period of the primary side switch during each switching period; generating a pre-inhibition signal indicative of a pre-inhibition interval during each switching period; when the ON control signal becomes enabled during the pre-inhibition interval, generating an inhibition signal indicative of the inhibition interval, so as to mask the ON control signal during the inhibition interval, thereby disabling triggering the primary side switching signal; wherein the pre-inhibition signal is generated according to the rising edge of the primary side switching signal within the previous switching period and the resonance period of the DCM resonance waveform, and wherein the pre-inhibition interval covers at least the ZVS pulse of the previous switching period.

In one embodiment, the step of generating the primary side switching signal further includes a following step: when the ON control signal becomes enabled beyond the pre-inhibition interval, the ON control signal is allowed to trigger the primary side switching signal.

In one embodiment, the step of generating the primary side switching signal further includes a following step: after the inhibition signal is enabled, counting time of the inhibition interval according to a resonance synchronization signal correlated with the resonance period, such that the inhibition interval lasts for at least one resonance period.

In one embodiment, the step of generating the primary side switching signal further includes a following step: after the inhibition signal is enabled, counting time of the inhibition interval according to a signal related to the resonance period, such that after the inhibition interval ends, the primary side switching signal is enabled at a time point when the third waveform characteristic of the DCM resonance waveform occurs, thus achieving zero voltage switching, wherein the occurrence time point of the third waveform characteristic is later than an occurrence time point of the second waveform characteristic.

In one embodiment, the step of generating the inhibition signal further includes following steps: starting generating a baseline ramp signal at a knee point of the primary side switching signal during the switching period; sampling and holding the baseline ramp signal at the rising edge of the primary side switching signal, so as to generate a valley memory signal; generating a first ramp signal and a second ramp signal, wherein a first offset level lies between the first ramp signal and the baseline ramp signal, whereas, a second offset level lies between the second ramp signal and the baseline ramp signal; comparing the first ramp signal with the baseline ramp signal and comparing the second ramp signal with the baseline ramp signal, so as to generate the pre-inhibition signal; wherein the pre-inhibition interval corresponds to a period wherein the baseline ramp signal lies between the first ramp signal and the second ramp signal; and determining whether an occurrence time point of a rising edge of the ON control signal is within the pre-inhibition interval, so as to generate the inhibition signal.

In one embodiment, both the first offset level and the second offset level are correlated with the resonance period.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 4:
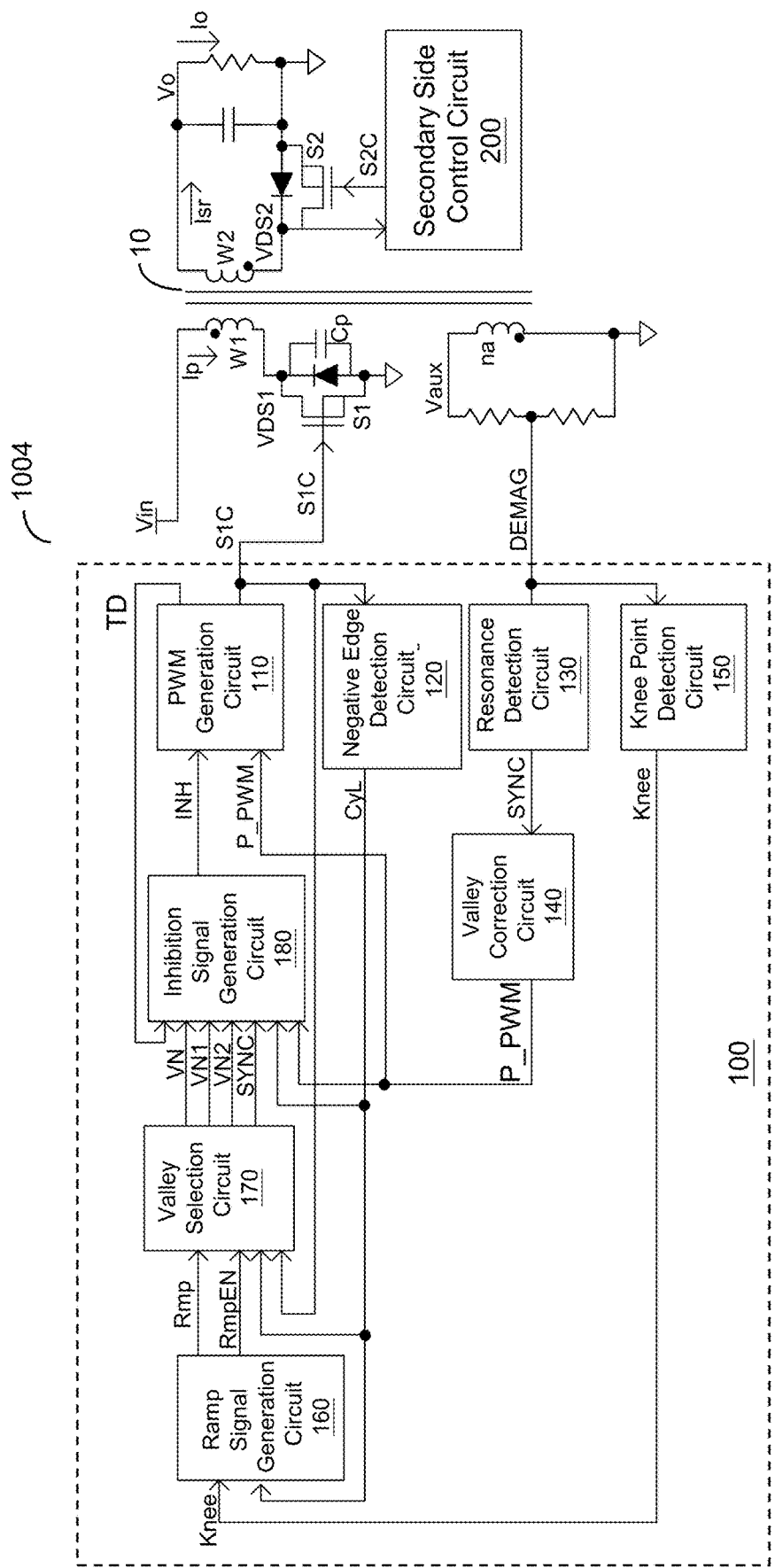
FIG. 4 shows a schematic diagram of a flyback converter according to an embodiment of the present invention.

Please refer to FIG. 4, which shows a schematic diagram of a flyback converter (i.e., flyback converter 1004) according to an embodiment of the present invention. The flyback power converter circuit 1004 is configured to operably convert an input voltage Vin to an output power Vo and generate an output current Io, which are supplied to a load circuit (which is not illustrated in FIG. 4; a load circuit is well known to those skilled in the art, so the details thereof are not redundantly explained here). The flyback power converter circuit 1004 comprises: a power transformer 10, a primary side control circuit 100 and a secondary side control circuit 200.

Figure 1A:
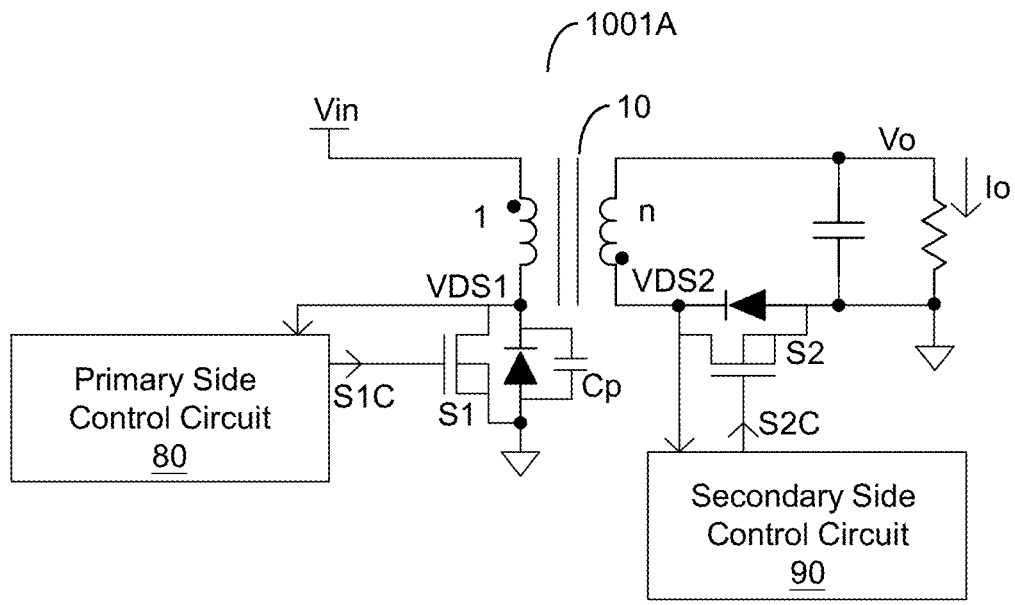
FIG. 1A and FIG. 1B show schematic diagrams of conventional flyback converters, respectively.
Figure 1B:
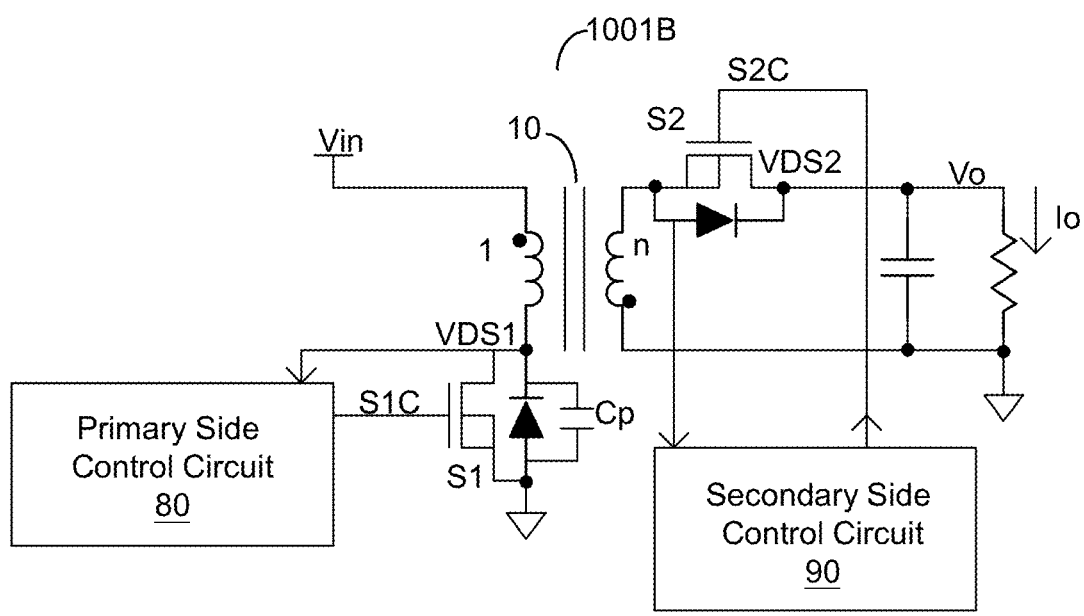
Figure 2:
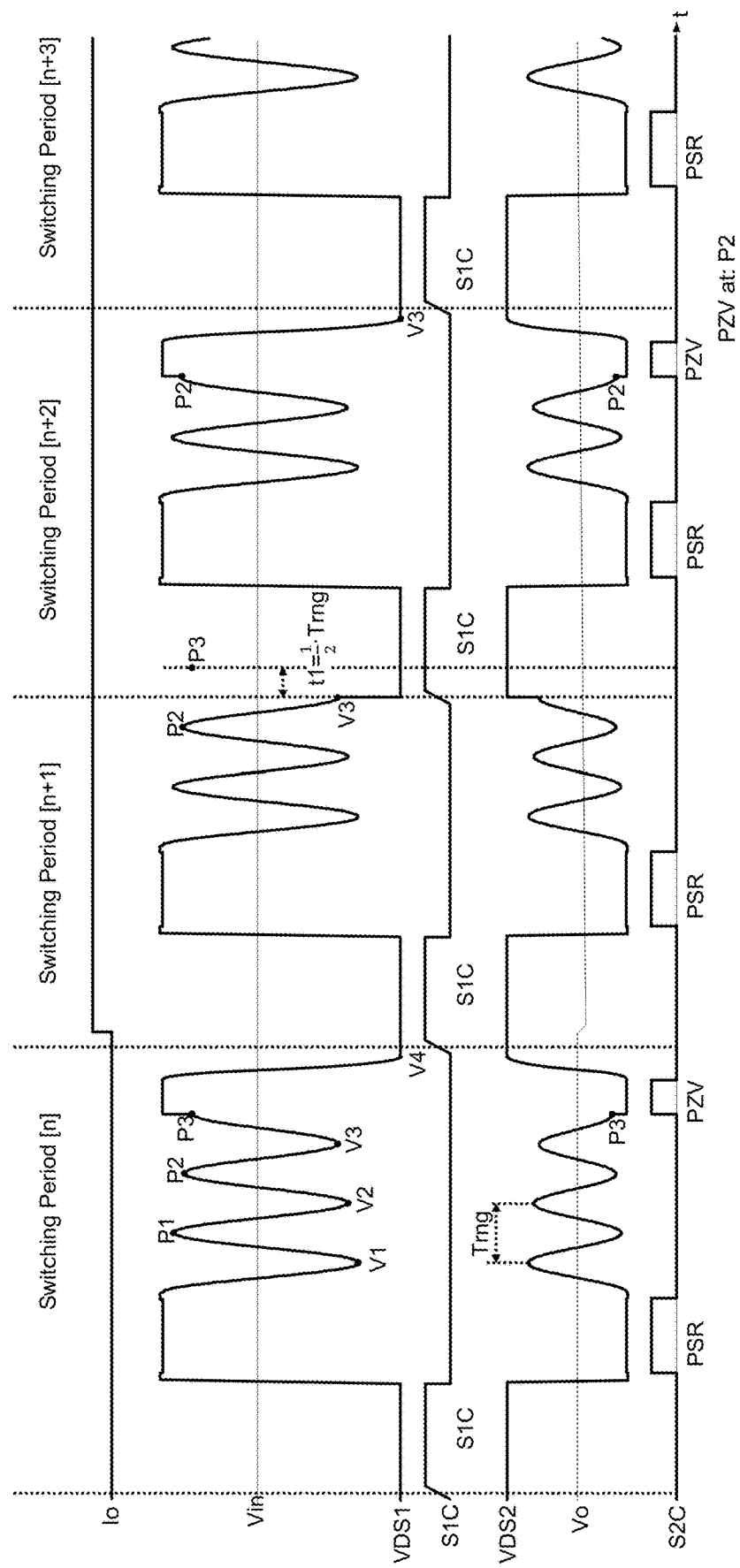
FIG. 2 illustrates a signal waveform diagram depicting the operation of conventional flyback converters of FIG. 1A and FIG. 1B.
Figure 3:
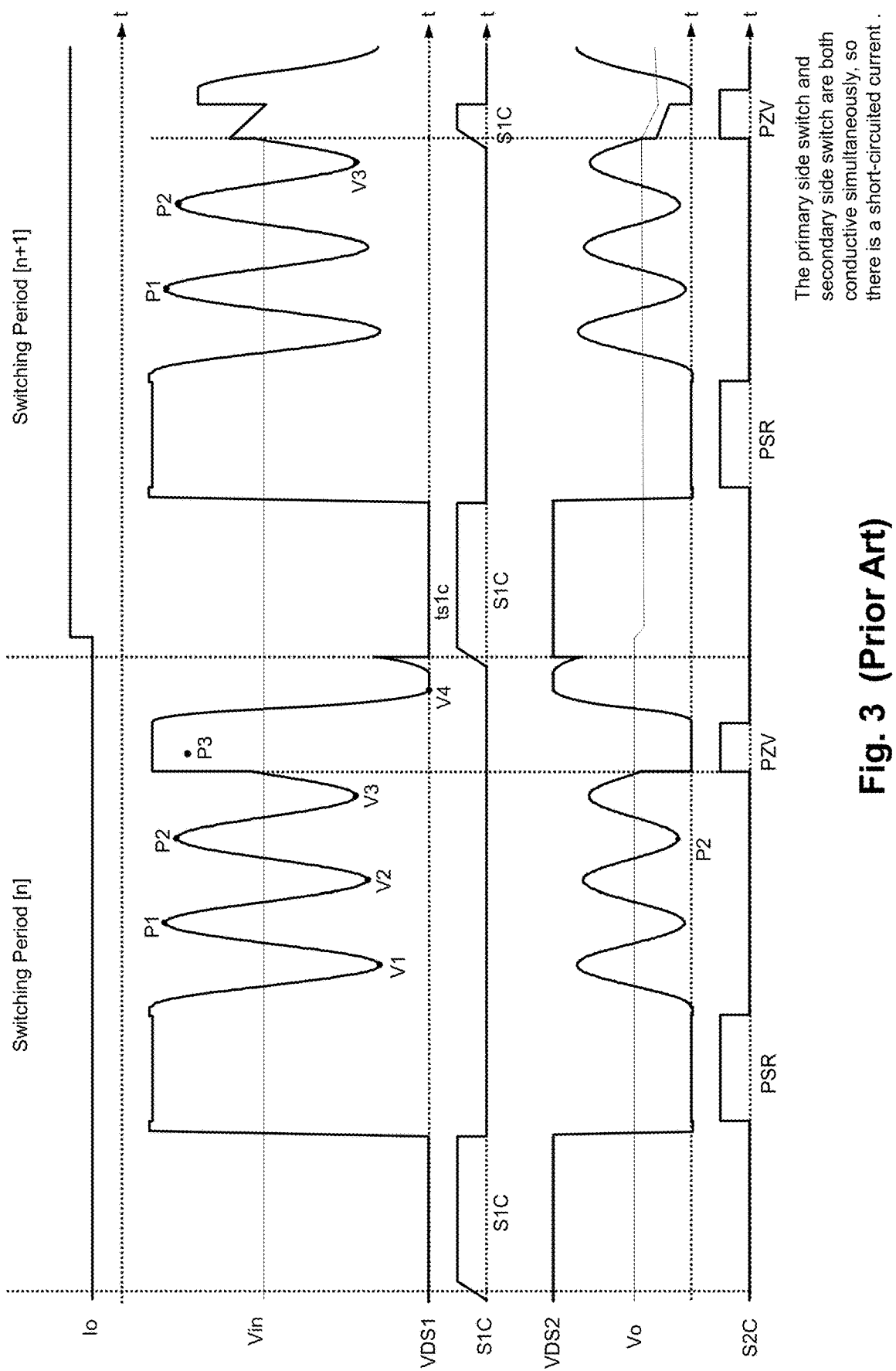
FIG. 3 illustrates a signal waveform diagram depicting the operation of conventional flyback converters of FIG. 1A and FIG. 1B.

The power transformer 10 is coupled between the input voltage Vin and the output voltage Vo in an isolated configuration. A primary side switch S1 is coupled to a primary winding W1 of the power transformer 10. The primary winding W1 is coupled to the input voltage Vin. A secondary side switch S2 and a secondary winding W2 of the power transformer 10 are connected in series between the output voltage Vo and a secondary side ground node. In this embodiment, the secondary side switch S2 is coupled between the secondary winding W2 of the power transformer 10 and the secondary side ground node. In another embodiment, the secondary side switch S2 can be coupled between the secondary winding W2 of the power transformer 10 and the output voltage Vo (as shown by the secondary side circuit in FIG. 1B). The spirit of the present invention will be explained by taking the implementation wherein the secondary side switch S2 is coupled between the secondary winding W2 of the power transformer 10 and the secondary side ground node as an example, as set forth in FIG. 4; however, it should be understood that the present invention is also applicable to the implementation wherein the secondary side switch S2 is coupled between the secondary winding W2 of the power transformer 10 and the output voltage Vo, as shown in FIG. 1B.

The primary side control circuit 100 is configured to operably generate a primary side switching signal S1C for controlling the primary side switch S1, so as to switch the primary winding W1 of the power transformer 10. The primary winding W1 is coupled to the input voltage Vin. The secondary side control circuit 200 is configured to operably generate a secondary side switching signal S2C for controlling the secondary side switch S2, so as to switch the secondary winding W2 of the power transformer 10. The secondary winding W2 generates an output voltage Vo. The reference "VDS1" shown in FIG. 4 denotes a drain voltage of the primary side switch S1, whereas, a reference "VDS2" shown in FIG. 4 denotes a voltage at a first end of the secondary side switch S2. In this embodiment, the "first end" of the secondary side switch S2 is a drain (i.e., a current outflow end) of the secondary side switch S2, whereas, the "second end" of the secondary side switch S2 is a source (i.e., a current inflow end) of the secondary side switch S2. However, in a different embodiment wherein the secondary side switch S2 is coupled between the secondary winding W2 of the power transformer 10 and the output voltage Vo (as shown by the secondary side circuits in FIG. 1B), the "first end" of the secondary side switch S2 is a source (i.e., a current inflow end) of the secondary side switch S2, whereas, the "second end" of the secondary side switch S2 is a drain (i.e., a current outflow end) of the secondary side switch S2.

Figure 5:
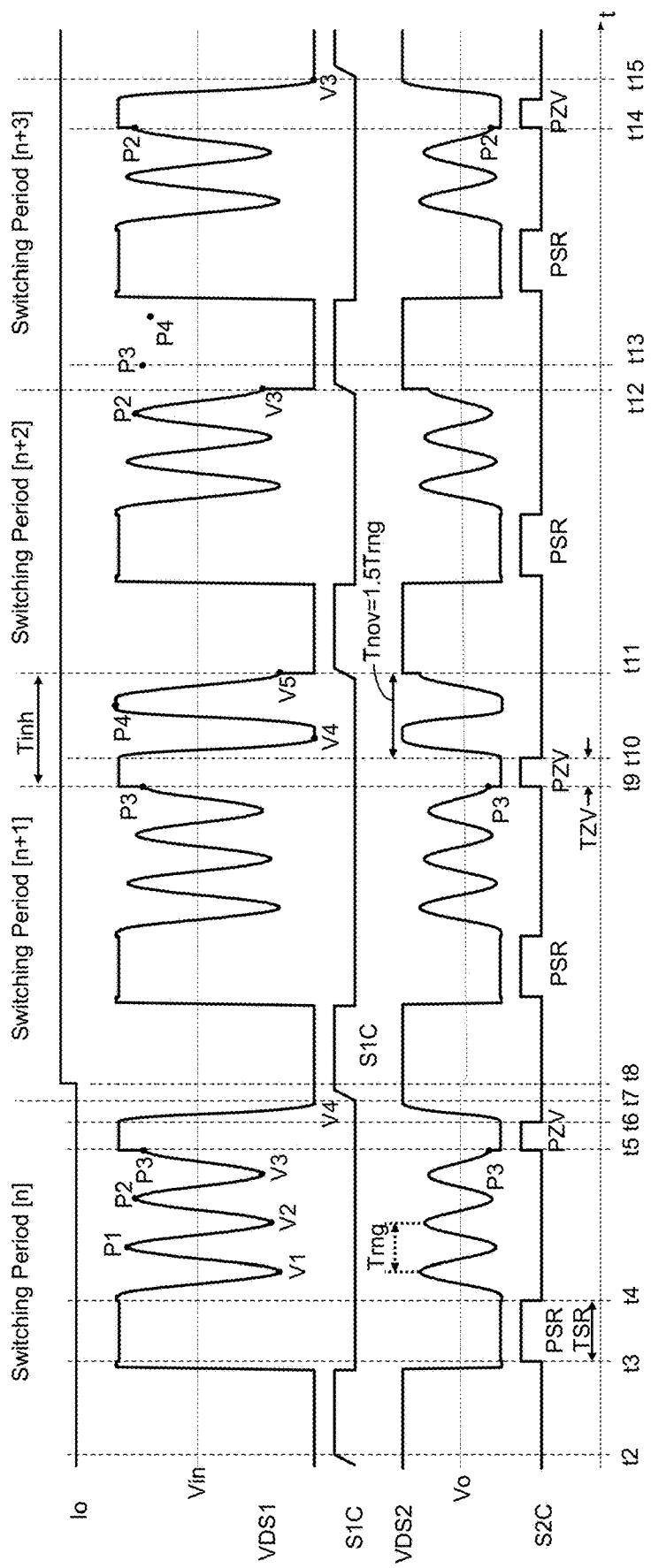
FIG. 5 illustrates a signal waveform diagram depicting the operation of a flyback converter of the present invention.

Please refer to FIG. 4 in conjugation with FIG. 5. FIG. 5 illustrates a signal waveform diagram depicting the operation of a flyback converter of the present invention. In this embodiment, the flyback converter 1004 of the present invention operates in a discontinuous conduction mode (DCM). According to the present invention, in one embodiment, the secondary side switching signal S2C has a synchronous rectifying (SR) pulse PSR and a zero voltage switching (ZVS) pulse PZV. After the primary side switch S1 is turned ON and then OFF (e.g. the time point t3 in FIG. 5), the SR pulse PSR is configured to operably control the secondary side switch S2 to be ON for a SR period TSR, so as to achieve synchronous rectification at a secondary side of the power transformer 10. The SR period TSR is substantially synchronous with an ON period of an induction current of the secondary side winding W2. In other words, an initiation time point of the SR period TSR corresponds to the time point at which the secondary side winding W2 receives energy from the primary side winding Who generate a secondary side current Isr (e.g., t3 in FIG. 5), whereas, an ending time point of the SR period TSR corresponds to the time point at which the secondary side current Isr is reduced to zero (e.g., t4 in FIG. 5). Thus, the flyback converter 1004 of the present invention can enhance power conversion efficiency.

Please still refer to FIG. 5. On the other hand, the ZVS pulse PZV is configured to operably cause the primary side switch S1 to achieve the zero voltage switching. More specifically, in this embodiment, when the flyback converter 1004 operates in a DCM mode, the power transformer 10 is magnetized during the ON period of the primary side switch S1 (e.g., as shown by a duration from the time point t2 to the time point t3 in FIG. 5). Thereafter, when the primary side switch S1 is turned OFF, the energy obtained will be delivered to the output voltage Vo. Next, the SR pulse PSR controls the secondary side switch S2 to be ON to demagnetize the power transformer 10 (e.g., as shown by the time point t4 in FIG. 5), and thereafter the secondary side switch S2 is controlled to be OFF (e.g., as shown by a duration from the time point t4 to the time point t5 in FIG. 5). In the duration from the time point t4 to the time point t5 wherein the secondary side switch S2 is OFF, the power transformer 10 generates a DCM resonance waveform; such DCM resonance waveform appears in the primary side voltage VDS1, the secondary side voltage VDS2 or the auxiliary voltage Vaux or DEMAG generated by an auxiliary winding W3 of the power transformer 10. Besides, the DCM resonance waveform has a resonance period Trng which is correlated to an inductance and a stray capacitance of the power transformer 10, in particular to an inductance and a stray capacitance of the primary winding W1.

When the secondary side switch S2 is once again ON at an initiation time point of the ZVS pulse (e.g., as shown by the time point t5 in FIG. 5), the power transformer 10 will generate a negative secondary side current Isr at the secondary side winding W2. On the other hand, when the secondary side switch S2 is once again OFF at an ending time point of the ZVS pulse (e.g., as shown by the time point t6 in FIG. 5), the power transformer 10 will generate a negative primary side current Ip at the primary side winding W1. During a period from the time point t6 to the time point t7 in FIG. 5, the negative primary side current Ip at the primary side winding W1 can discharge a parasitic capacitor Cp of the primary side switch S1, so that the drain voltage VDS1 of the primary side switch S1 is reduced to a lower voltage level; in addition, the negative primary side current Ip can store charges back to the input power via the primary side winding W1, so that when the primary side switch S1 is once again ON, the primary side switch S1 can achieve zero voltage switching. In one embodiment, the negative primary side current Ip can discharge the parasitic capacitor Cp of the primary side switch S1 to substantially equal to 0V, so that the primary side switch S1 can achieve zero voltage switching.

It is noteworthy that, as one of average skill in the art will readily understand, "Zero Voltage Switching (ZVS)" refers to: before a transistor (e.g., corresponding to the primary side switch S1) is to be turned ON, the residue voltage in the parasitic capacitor (e.g., corresponding to the capacitor Cp) of this transistor is discharged to a low level by a discharging current through a discharging path having low or no power loss (e.g., corresponding to the primary side winding W1) and the charges are stored back to a device having low or no power loss (e.g., the input power), whereby when it is time for this transistor to be turned ON, the drain-source voltage of this transistor is reduced to a very low voltage. Because the parasitic capacitor (e.g., corresponding to the parasitic capacitor Cp of the primary side switch S1) of this transistor is not discharged through the conduction resistance of the transistor, the power conversion efficiency is enhanced.

Besides, it is worthwhile noting that, in the present invention, although the parasitic capacitor being discharged to 0V is preferred, however due to non-idealities caused by for example imperfection of components or imperfect matching among components, the voltage of the parasitic capacitor Cp may not be discharged exactly to 0V, but just close to the 0V. In other words, according to the present invention, a certain level of error between 0V and the voltage on the parasitic capacitor after discharge is acceptable, and therefore the term "substantially" is used to mean that an insignificant error within a tolerable range is acceptable. The terms "substantially" used elsewhere in this specification also means that an insignificant error within a tolerable range is acceptable.

In one embodiment, an initiation time point of the above-mentioned ZVS pulse PZV (e.g., as shown by the time point t5 in FIG. 5) is synchronous with a first waveform characteristic of a resonance waveform which occurs after the power transformer 10 has been demagnetized. The embodiment shown in FIG. 5 is taken herein as an example. The secondary side control circuit 200 can adaptively select a specific serial number of valley which occurs in a resonance waveform of the voltage VDS2 of the secondary side switch S2 after the power transformer 10 has been demagnetized according to a level of the output current Io as an initiation time point of the above-mentioned ZVS pulse PZV, thereby controlling the secondary side switch S2 to also achieve zero voltage switching. For example, as shown in FIG. 5, the ZVS pulse PZV is initiated at the time point t5 in correspondence to a third valley in a resonance waveform of the voltage VDS2 of the secondary side switch S2, which is the time point of a third peak in a resonance waveform of the voltage VDS1 of the primary side switch S1 (e.g., as shown by the peak P3 in FIG. 5). For consistency, both the third peak in the resonance waveform of the voltage VDS1 of the primary side switch S1 and the third valley in the resonance waveform of the voltage VDS2 of the secondary side switch S2 are labeled as "P3". Besides, the primary side control circuit 100 can adaptively select another characteristic such as a valley next to the peak (e.g., the fourth valley V4 in the waveform of the voltage VDS1 at the time point t7 in FIG. 5) of the above-mentioned resonance waveform as a turned-ON time point of the primary side switch S1. By doing so, both the primary side switch S1 and the secondary side switch S2 can achieve zero voltage switching, thereby enhancing power conversion efficiency. Moreover, there is no need for the flyback converter 1004 of the present invention to provide an extra isolated communication route (such as a pulse transformer) to ensure that the switching timings of the primary side switch S1 and the secondary side switch S2 are synchronous with each other but do not overlap with each other. In one embodiment, in a steady state (e.g., as shown by the switching period [n] in FIG. 5), the non-overlapping interval between the ON period of the primary side switch S1 and the ON period of the switching timing of the secondary side switch S2 is equal to 0.5-fold of the resonance period Trng.

Please still refer to FIG. 5. In order to avoid the above-mentioned short-circuited current, in one embodiment, when for example the output power or the output current Io increases due to a variation in load condition, the turned-ON time point of the primary side switch S1 will be postponed by at least one resonance period Trng of the resonance waveform. The embodiment shown in FIG. 5 is taken herein as an example. Subsequent to the time point t8 at which the output current Io increases, during the switching period [n+1], when the flyback converter 1004 intends to turn ON the primary side switch S1 earlier than the turned-ON time point of the primary side switch S1 during a previous switching period (i.e., switching period [n]) according to feedback mechanism (the increase of the load condition demanding longer ON period of the primary side switch S1), an inhibition interval Tinh (from the time point t9 to the time point t11 in FIG. 5) masks and postpones such turned-ON time point, such that the primary side switch S1 is turned ON at the time point t11 corresponding to the fifth valley V5 in the resonance waveform of the voltage VDS1 of the primary side switch S1. In other words, during the inhibition interval Tinh, it can be ensured that the primary side switching signal S1C and the ZVS pulse PZV do not overlap with each other, so as to ensure that the primary side switch S1 and secondary side switch S2 will not be both conductive simultaneously.

Please still refer to FIG. 5. In one embodiment, when the flyback converter 1004 intends to turn ON the primary side switch S1 earlier than the turned-ON time point of the primary side switch S1 during a previous switching period according to feedback mechanism, while the intended turned-ON time point of the primary side switch S1 is prior to an initiation time point of the ZVS pulse PZV, the turned-ON time point of the primary side switch S1 is determined according to the feedback mechanism. That is, under such circumstance, there is no need to postpone the turned-ON time point of the primary side switch S1. The embodiment shown in FIG. 5 is taken herein as an example. During the switching period [n+2], when the flyback converter 1004 intends to turn ON the primary side switch S1 earlier, which is at the time point of a third valley V3 (at the time point t12 in FIG. 5) in the resonance waveform of the voltage VDS1 according to feedback mechanism, because the occurrence time point of the third valley V3 (the time point t12) is prior to an initiation time point of the ZVS pulse PZV if the ZVS pulse PZV is generated within the switching period [n+2] (i.e. at the peak P3 at the time point t13 in FIG. 5), the primary side switch S1 is straightforwardly turned ON at the third valley V3 in the resonance waveform of the voltage VDS1 (i.e. at the time point t12). Besides, when the turned-ON time point of the primary side switch S1 is prior to the supposed initiation time point of the ZVS pulse PZV, the ZVS pulse PZV will not be generated, as referring to the switching period [n+2].

According to the present invention, in one embodiment, an inhibition interval Tinh of a present switching period (e.g., switching period [n+1]) is correlated with a position where a ZVS pulse PZV is located within a previous switching period (e.g., switching period [n]). In more detail, the inhibition interval Tinh is generated according to a rising edge of the primary side switching signal S1C and a resonance period Trng of a DCM resonance waveform, the details of which will be more fully explained later.

Please still refer to FIG. 5. After a new steady state is reached after the output current Io increases, as shown by a switching period [n+3] in FIG. 5, the primary side switch S1 will be turned ON at an occurrence time point (e.g., the time point t15 in FIG. 5) of the third valley V3 in the resonance waveform of the voltage VDS1. On the other hand, the initiation time point of the ZVS pulse PZV within the switching period [n+3] will be adaptively adjusted earlier, to an occurrence time point of the second peak P2 in the resonance waveform of the voltage VDS1 (at the time point t14, which corresponds to a second valley P2 in the resonance waveform of the voltage VDS2).

Please still refer to FIG. 4. FIG. 4 further shows a specific embodiment of a primary side control circuit (i.e., primary side control circuit 100) according to the present invention. In this embodiment, the primary side control circuit 100 includes: a pulse width modulation (PWM) generation circuit 110, a negative edge detection circuit 120, a resonance detection circuit 130, a valley correction circuit 140, a knee point detection circuit 150, a ramp signal generation circuit 160, a valley selection circuit 170 and an inhibition signal generation circuit 180.

Figure 6:
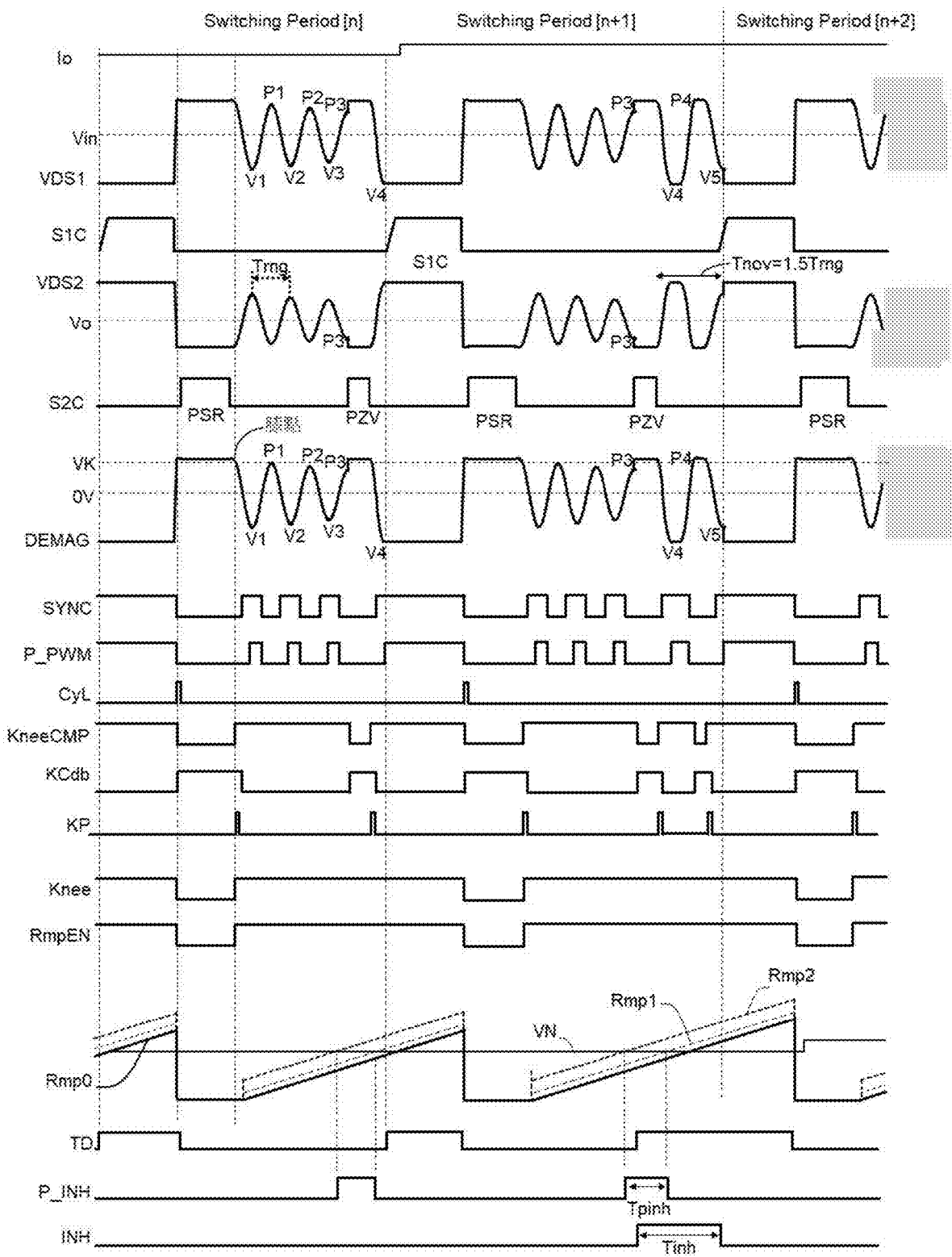
FIG. 6 illustrates a signal waveform diagram depicting the operation of a flyback converter of the present invention.

Please refer to FIG. 6 in conjugation with FIG. 4. FIG. 6 illustrates a signal waveform diagram depicting the operation of a flyback converter of the present invention.

In one embodiment, the PWM generation circuit 110 is configured to operably generate an ON control signal TD according to a feedback signal (related to for example but not limited to an output voltage Vo and/or an output current Io), so as to trigger and determine a turned-ON time point and an ON period of the primary side switch S1. Besides, the PWM generation circuit 110 is further configured to operably generate a primary side switching signal S1C according to a valley indication signal P_PWM and an inhibition signal INH, so as to control the primary side switch S1.

The negative edge detection circuit 120 is configured to operably detect a negative edge (i.e., a falling edge) of the primary side switching signal S1C, so as to generate a negative edge signal CyL indicative of an occurrence time point of the negative edge (i.e., the falling edge) of the primary side switching signal S1C.

The ramp signal generation circuit 160 is configured to operably generate a ramp signal Rmp according to a knee point signal Knee and the negative edge signal CyL. In more detail, the ramp signal generation circuit 160 starts generating the ramp signal Rmp at a time point corresponding to a knee point of the primary side switching signal S1C. And, the ramp signal generation circuit 160 will be reset when the negative edge (i.e., the falling edge) of the primary side switching signal S1C occurs.

The valley selection circuit 170 is configured to operably sample and hold a ramp signal Rmp corresponding to a previous switching period, so as to generate a valley memory signal VN. Besides, the valley selection circuit 170 is configured to operably generate a ramp signal Rmp1 and a ramp signal Rmp2 which have respective offset levels.

The inhibition signal generation circuit 180 is configured to operably generate an inhibition signal INH according to the ramp signal Rmp1, the ramp signal Rmp2 and the valley memory signal VN. The primary side switch S1 is disabled within an inhibition interval Tinh of the inhibition signal INH, so as to postpone a turned-ON time point of the primary side switch S1. To elaborate in more detail, the inhibition signal generation circuit 180 is configured to operably estimate a ZVS pulse PZV within a previous switching period according to the valley memory signal VN within the previous switching period, the ramp signal Rmp1 and the ramp signal Rmp2, so as to estimate a time point of a ZVS pulse PZV corresponding to a present switching period, thereby generating an inhibition signal INH corresponding to the present switching period.

The knee point detection circuit 150 is configured to operably generate a knee point signal Knee according to an auxiliary signal DEMAG, wherein the knee point signal Knee is indicative of a knee point of a voltage VDS1 of the primary side switch S1.

The resonance detection circuit 130 is configured to operably generate a resonance synchronization signal SYNC according to the auxiliary signal DEMAG, wherein the resonance synchronization signal SYNC is indicative of a falling edge of a voltage VDS1 of the primary side switch S1.

The valley correction circuit 140 is configured to operably generate the valley indication signal P_PWM according to the resonance synchronization signal SYNC.

Referring to FIG. 6, in this embodiment, the flyback converter 1004 of the present invention operates as thus: when the flyback converter 1004 of the present invention is in a steady state (e.g., in the switching period [n]), the secondary side control circuit 200 enables the ZVS pulse PZV at the occurrence time point of the third peak P3 (as shown by the peak P3 within the switching period [n] in FIG. 6) in the resonance waveform of the voltage VDS1, whereas, the primary side control circuit 100 enables the primary side switching signal S1C at the occurrence time point of the fourth valley V4 (as shown by valley V4 within the switching period [n] in FIG. 6) in the resonance waveform of the voltage VDS1, wherein the occurrence time point of the fourth valley V4 in the resonance waveform of the voltage VDS1 occurs later than the occurrence time point of the third peak P3 in the resonance waveform of the voltage VDS1.

In the case where the output power or the output current Io increases in comparison to the steady state, during the present switching period (e.g., the switching period [n+1]), the primary side control circuit 100 delays enabling the primary side switching signal S1C for example by one valley; that is, during the present switching period (e.g., the switching period [n+1]), the primary side control circuit 100 enables the primary side switching signal S1C at the occurrence time point of the fifth valley V5 in the resonance waveform of the voltage VDS1 within the switching period [n+1], so as to prevent the primary side switch S1 and the secondary side switch S2 from being both conductive simultaneously, wherein the occurrence time point of the fifth valley V5 in the resonance waveform of the voltage VDS1 occurs later than the occurrence time point of the fourth valley V4 in the resonance waveform of the voltage VDS1.

Specific embodiments and explanations of the above-mentioned sub-circuits operate are described below.

Figure 7:
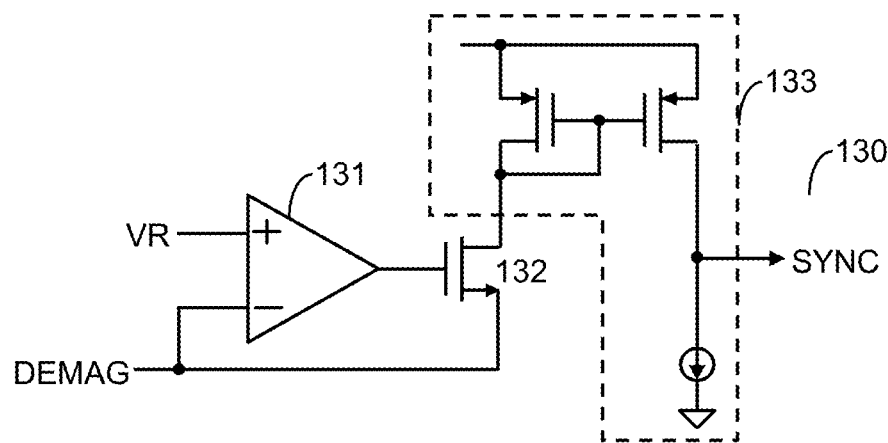
FIG. 7 shows a specific embodiment of a resonance detection circuit.

Please refer to FIG. 7, which shows a specific embodiment of a resonance detection circuit (i.e., resonance detection circuit 130). The resonance detection circuit 130 includes: an amplifier circuit 131, a transistor 132 and a current-voltage conversion circuit 133. The resonance detection circuit 130 is configured to operably detect whether the auxiliary signal DEMAG is lower than a reference signal VR, so as to generate a resonance synchronization signal SYNC. In one embodiment, the reference signal VR is a reference voltage which is equal to zero or is approximately equal to zero, so that the resonance synchronization signal SYNC is indicative of whether the auxiliary signal DEMAG is a negative voltage. The resonance synchronization signal SYNC is also indicative of whether the voltage VDS1 of the primary side switch S1 is lower than the input voltage Vin. From one perspective, the rising edge of the resonance synchronization signal SYNC indicates a central point in a curve in which the voltage VDS1 falls from a peak to a valley, whereas, the falling edge of the resonance synchronization signal SYNC indicates a central point at a path in a curve in which the voltage VDS1 rises from a valley to a peak.

Figure 8:
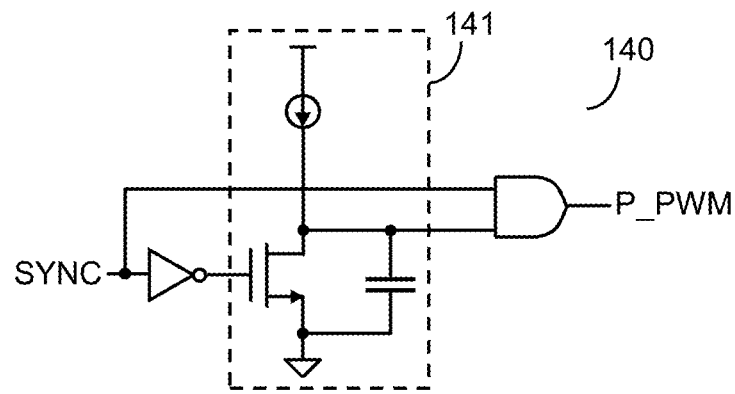
FIG. 8 shows a specific embodiment of a valley correction circuit.

Please refer to FIG. 8, which shows a specific embodiment of a valley correction circuit (i.e., valley correction circuit 140). The valley correction circuit 140 includes: a delay circuit 141 and a logic circuit. The valley correction circuit 140 is configured to operably generate a valley indication signal P_PWM. Note that a falling edge of the valley indication signal P_PWM is aligned with a falling edge of the resonance synchronization signal SYNC. The delay circuit 141 is configured to operably delay a rising edge of the resonance synchronization signal SYNC to generate the valley indication signal P_PWM, so that an occurrence time point of a rising edge of valley indication signal P_PWM is later than an occurrence time point of a rising edge of the resonance synchronization signal SYNC by a delay interval, wherein a length of the delay interval between the rising edge of valley indication signal P_PWM and the rising edge of the resonance synchronization signal SYNC can be adjusted by setting the capacitor and the current source in the figure. From one perspective, by properly setting the above-mentioned length of the delay interval, the rising edge of the valley indication signal P_PWM can be used to indicate, for example, an occurrence time point of a valley in the resonance waveform of the voltage VDS1.

Figure 9:
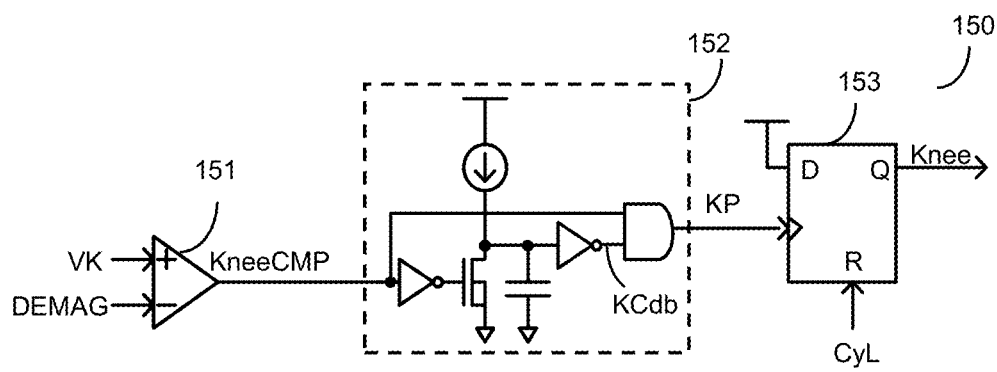
FIG. 9 shows a specific embodiment of a knee point detection circuit.

Please refer to FIG. 9, which shows a specific embodiment of a knee point detection circuit (i.e., knee point detection circuit 150) according to the present invention. The knee point detection circuit 150 includes: a comparator 151, a pulse circuit 152, a state circuit 153 and a logic circuit. The state circuit 153 can be, for example but not limited to, a flip-flop. The comparator 151 is configured to operably compare the auxiliary signal DEMAG with a reference signal VK, so as to generate a comparison result KneeCMP. The pulse circuit 152 is configured to operably generate a knee point pulse KP according to the comparison result KneeCMP and a delay inversed-phase signal KCdb, so as to trigger the flip-flop (i.e., the state circuit 153) to enable a knee point signal Knee. In one embodiment, the delay inversed-phase signal KCdb is a one-side inversed-phase signal of the comparison result KneeCMP. A negative edge signal CyL is employed reset the knee point signal Knee. In other words, as shown in FIG. 6, the rising edge of the knee point signal Knee is indicative of a knee point in the resonance waveform of the voltage VDS1 of the primary side switch S1.

Figure 10:
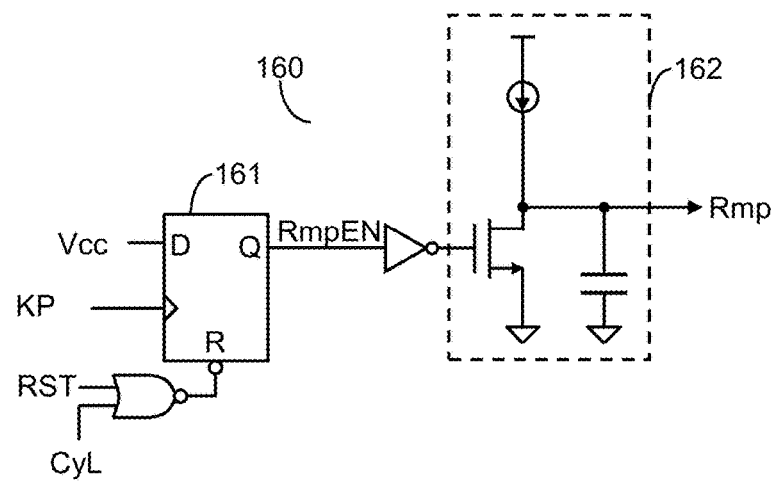
FIG. 10 shows a specific embodiment of a ramp signal generation circuit.

Please refer to FIG. 10, which shows a specific embodiment of a ramp signal generation circuit (i.e., ramp signal generation circuit 160). The ramp signal generation circuit 160 includes: a flip-flop 161 and an integration circuit 162. The flip-flop 161 is configured to operably generate a ramp enablement signal RmpEN according to a rising edge of the knee point signal Knee, so as to enable the integration circuit 162 to start charging a capacitor via a current source, thereby generating a ramp signal Rmp. The flip-flop 161 can be reset at a timing determined by a system reset signal RST or the negative edge signal CyL. In other words, the ramp signal Rmp begins to rise at an occurrence time point of the rising edge of the knee point signal Knee, and the ramp signal Rmp will cease to rise at an occurrence time point of the negative edge signal CyL within a next switching period.

Figure 11:
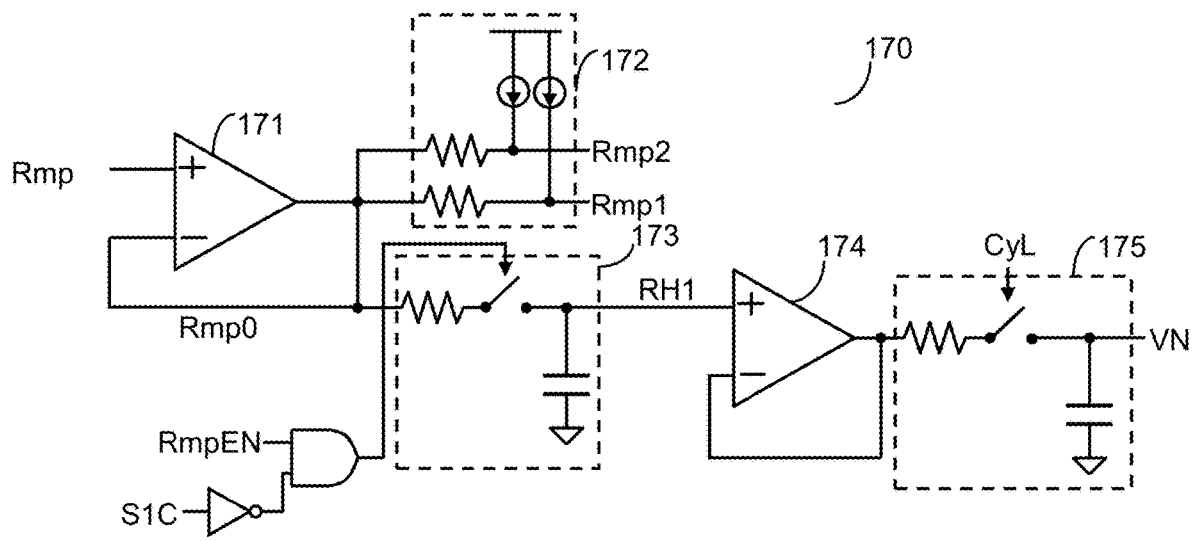
FIG. 11 shows a specific embodiment of a valley selection circuit.

Please refer to FIG. 11, which shows a specific embodiment of a valley selection circuit (i.e., valley selection circuit 170). The valley selection circuit 170 includes: an amplifier 171, an offset circuit 172, a sample-and-hold circuit 173 and a sample-and-hold circuit 175. The amplifier 171 is configured to operably generate a buffered ramp signal Rmp according to a ramp signal Rmp. The sample-and-hold circuit 173 is configured to operably sample the ramp signal Rmp at an occurrence time point of a rising edge of the ramp enablement signal RmpEN and is configured to operably generate a ramp level signal RH1 according to the sampled and held the ramp signal Rmp at an occurrence time point of a rising edge of the primary side switching signal S1C. The sample-and-hold circuit 175 is configured to operably sample and hold the ramp level signal RH1 at an occurrence time point of a falling edge of the primary side switching signal S1C according to the negative edge signal CyL, so as to generate a valley memory signal VN. In other words, the level of the valley memory signal VN is obtained by sampling and holding a level which occurs at a rising edge of the primary side switching signal S1C, and is updated at a falling edge of the primary side switching signal S1C.

Besides, the offset circuit 172 is configured to operably offset the ramp signal Rmp, so as to generate the ramp signal Rmp1 and the ramp signal Rmp2 having respective offset levels. The offset level of the ramp signal Rmp1 with respect to the ramp signal Rmp is determined by the corresponding current source and the corresponding resistor as shown in the figure, whereas, the offset level of the ramp signal Rmp2 with respect to the ramp signal Rmp is determined by the corresponding current source and the corresponding resistor as shown in the figure.

Figure 12:
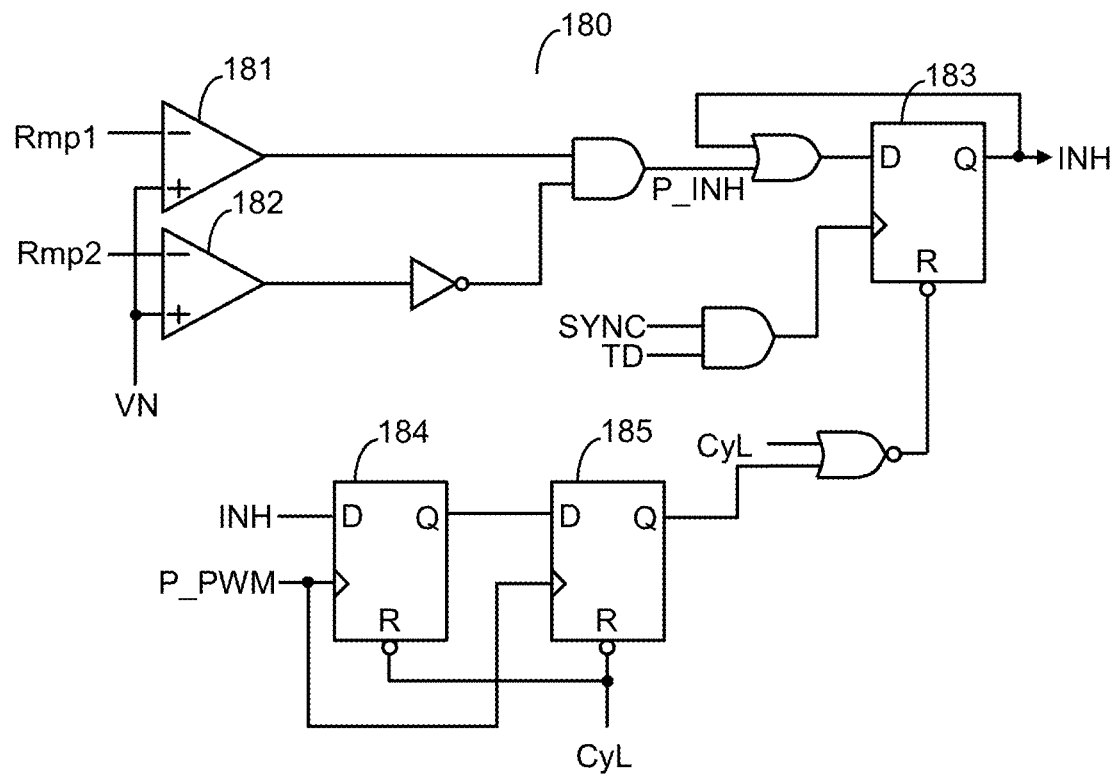
FIG. 12 shows a specific embodiment of an inhibition signal generation circuit.

Please refer to FIG. 12, which shows a specific embodiment of an inhibition signal generation circuit (i.e., inhibition signal generation circuit 180). The inhibition signal generation circuit 180 includes: a comparator 181, a comparator 182, flip-flops 183, 184 and 185 and several logic circuits.

The voltage level of the aforementioned ramp signal Rmp is positively proportional to a length of a duration after a knee point in the resonance waveform of the voltage VDS1 of the primary side switch S1. Accordingly, from one perspective, the level of the valley memory signal VN is indicative of a length of OFF period of the primary side switch S1 within a previous switching period. The inhibition signal generation circuit 180 is configured to operably compare the ramp signal Rmp1 with the valley memory signal VN via the comparator 181 and compare the ramp signal Rmp2 with the valley memory signal VN via the comparator 182, so as to generate a pre-inhibition signal P_INH indicative of the pre-inhibition interval Tpinh. The pre-inhibition signal P_INH corresponds to an interval wherein the valley memory signal VN lies between the ramp signal Rmp1 and the ramp signal Rmp2. Next, at an occurrence time point of a rising edge of the resonance synchronization signal SYNC or at an occurrence time point of a rising edge of the ON control signal TD, the inhibition signal generation circuit 180 determines whether to enable an inhibition signal INH according to whether the inhibition signal P_INH is enabled via the flip-flop 183. In other words, in one embodiment, when the load condition varies and the feedback mechanism is likely to cause the ON control signal TD to be triggered within the pre-inhibition interval Tpinh, the inhibition signal generation circuit 180 enables the inhibition signal INH, so as to disable the primary side switch S1 so that the primary side switch S1 will not be turned ON immediately, the details of which will be explained later.

In addition, the negative edge signal CyL is employed to reset the inhibition signal INH at the occurrence time point of the negative edge of the primary side switching signal S1C, so as to prepare for the inhibition signal INH to be enabled within the switching period. On the other hand, after the inhibition signal INH is enabled, the flip-flop 184 and the flip-flop 185 form a delay circuit to determine the length the inhibition signal INH (i.e., the pre-inhibition interval Tpinh) where will last. In one embodiment, the pre-inhibition interval Tpinh is determined according to the period of a rising edge adjacent to the valley indication signal P_PWM and the amount of the flip-flops. Accordingly, the pre-inhibition interval Tpinh is correlated with the resonance period Trng of the above-mentioned resonance waveform. As the result, in one preferred embodiment, after the pre-inhibition interval Tpinh ends, the primary side switching signal S1C can be enabled at for example the occurrence time point of another valley in the DCM resonance waveform which occurs after the pre-inhibition interval Tpinh, to still achieve zero voltage switching. In this embodiment, the pre-inhibition interval Tpinh is greater than or equal to 1.5-fold of the resonance period Trng of the above-mentioned resonance waveform.

It is noteworthy that, in one embodiment, the offset level of the ramp signal Rmp1 with respect to the ramp signal Rmp and the offset level of the ramp signal Rmp2 with respect to the ramp signal Rmp determine the initiation time point and the ending time point of the pre-inhibition interval Tpinh. On the other hand, in the steady state, the turned-ON time point of the primary side switch S1 and the ending time point of the ZVS pulse PZV are correlated to the resonance period Trng. Given the above-mentioned two features, accordingly, in one embodiment, the offset level of the ramp signal Rmp1 with respect to the ramp signal Rmp and the offset level of the ramp signal Rmp2 with respect to the ramp signal Rmp are correlated with the resonance period Trng and the pulse width TZV of the ZVS pulse PZV. In one preferred embodiment, the pre-inhibition interval Tpinh covers at least the ZVS pulse PZV within the previous switching period.

Figure 13:
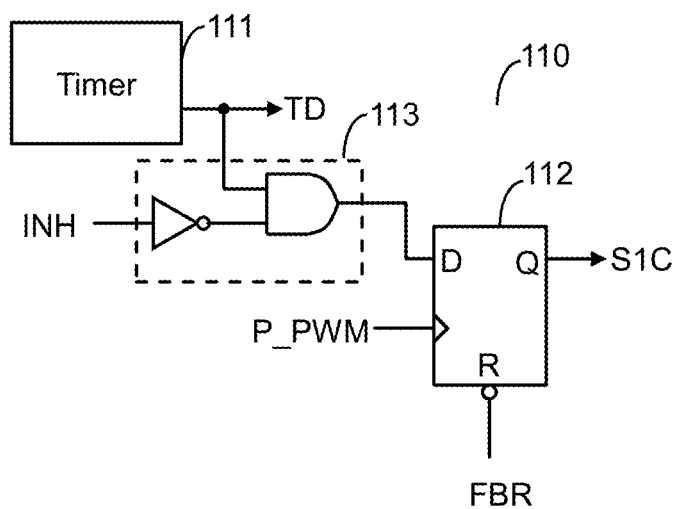
FIG. 13 shows a specific embodiment of a pulse width modulation (PWM) signal generation circuit.

Please refer to FIG. 13, which shows a specific embodiment of a pulse width modulation (PWM) signal generation circuit (i.e., PWM signal generation circuit 110) according to the present invention. The PWM signal generation circuit 110 includes: a timer 111 and a flip-flop 112. The timer 111 is configured to operably generate an ON control signal TD according to a feedback signal related to the output power (e.g., the output current Io and/or the output voltage Vo). The thus generated ON control signal TD is configured to operably determine a turned-ON time point and an ON period of the primary side switch S1. In more detail, in this embodiment, the flip-flop 112 is reset according to a signal FBR related to the feedback signal, so as to determine a turned-ON time point of the primary side switching signal S1C, to thereby regulate the output voltage Vo and/or the output current Io. Besides, by the valley indication signal P_PWM, the initiation time point of primary side switching signal S1C can be synchronous with for example a valley in the resonance waveform of the voltage VDS1 of the primary side switch S1, thus achieving the above-mentioned zero voltage switching, wherein the signal FBR is for example correlated to the output current Io and/or the output voltage Vo. Moreover, in the case where the load condition increases and the ON control signal TD is likely to be enabled during the inhibition interval Tinh, the logic circuit 113 (e.g., the AND gate and the NOT gate as shown in the figure) is configured to operably mask the ON control signal TD during the inhibition interval Tinh according to the inhibition signal INH, so as to disable triggering the primary side switching signal S1C, thereby postponing the turned-ON time point of the primary side switch S1, to effectively preventing short-circuited current from occurring.

More specifically, referring to the switching period [n+1] in FIG. 6, the ON control signal TD is enabled during the pre-inhibition interval Tpinh, which triggers the inhibition signal INH. As a result, the ON control signal TD is masked during the inhibition interval Tinh, so as to disable triggering the primary side switching signal S1C, so that the primary side switching signal S1C within the switching period [n+2] is postponed. As a result, the primary side switching signal S1C within the switching period [n+2] is triggered at the end of the inhibition interval Tinh.

Figure 14:
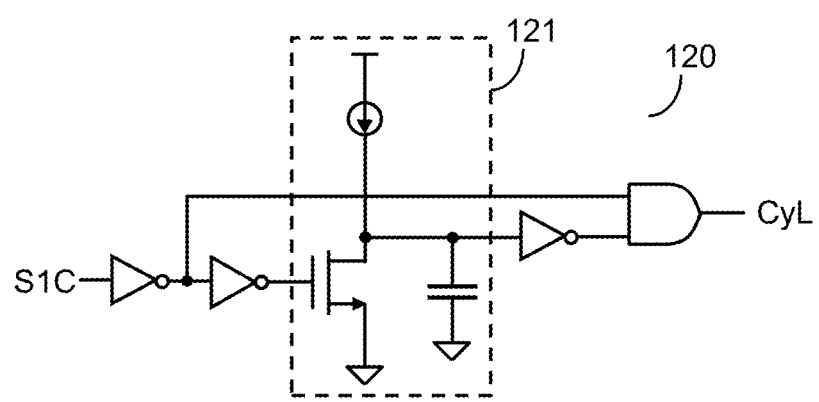
FIG. 14 shows a specific embodiment of a negative edge detection circuit.

Please refer to FIG. 14, which shows a specific embodiment of a negative edge detection circuit (i.e., negative edge detection circuit 120). The negative edge detection circuit 120 includes a delay circuit 121 and several logic circuits. The negative edge detection circuit 120 is configured to operably detect a negative edge of the primary side switching signal S1C, so as to generate a negative edge signal CyL.

From one perspective, the flyback converter 1004 of the present invention can memorize a valley occurrence time point in a previous switching period in an analog fashion, so as to generate a pre-inhibition signal P_INH in a present switching period at a timing corresponding to the valley occurrence time point in the previous switching period, i.e., at or nearby a corresponding serial number of valley. Moreover, in a case where there is a likelihood that the primary side switch S1 and secondary side switch S2 may both be conductive simultaneously, the flyback converter 1004 of the present invention can generate an inhibition signal INH, so as to mask and disable triggering the primary side switching signal S1C. Under such implementation, in an case where the ON control signal TD is enabled during the pre-inhibition interval Tpinh due to an event that the load condition increases, the turned-ON time point of the primary side switch S1 is postponed, thereby effectively preventing short-circuited current from occurring. Furthermore, it is worthwhile noting that, in the present invention, the turned-ON time point of the primary side switch S1 is postponed by a delay period Tnov, which is correlated with a resonance period Trng of a resonance waveform. In one embodiment, the delay period Tnov is correlated with a multiple of 0.5-fold of resonance period Trng. In one embodiment, the delay period Tnov is equal to 1.5-fold of resonance period Trng.

The present invention is described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching controller circuit, which is configured to operably control a flyback converter, so as to convert an input power to an output power, wherein the flyback converter includes: a power transformer, which is coupled between the input power and the output power; a primary side switch, which is configured to operably control a primary winding of the power transformer; and a secondary side switch, which is configured to operably control a secondary winding of the power transformer; the switching controller circuit comprising:

a primary side control circuit, which is configured to operably generate a primary side switching signal for controlling the primary side switch during a switching period; and a secondary side control circuit, which is configured to operably generate a secondary side switching signal for controlling the secondary side switch, wherein the secondary side switching signal has a synchronous rectifying (SR) pulse and a zero voltage switching (ZVS) pulse, wherein the SR pulse is configured to operably control the secondary side switch to be conductive for a SR period, so as to achieve synchronous rectification at a secondary side of the power transformer, and wherein the ZVS pulse is configured to operably control the secondary side switch to be conductive for a ZVS period, so as to cause the primary side switch to achieve zero voltage switching;

wherein in a steady state, the secondary side control circuit is configured to operably enable the ZVS pulse according to a first waveform characteristic of a discontinuous conduction mode (DCM) resonance waveform, whereas, the primary side control circuit is configured to operably enable the primary side switching signal according to a second waveform characteristic of the DCM resonance waveform, wherein the second waveform characteristic of the DCM resonance waveform occurs later than the first waveform characteristic of the DCM resonance waveform;

wherein in a case where the output power or an output current of the output power increases in comparison to the steady state, during a present switching period, the primary side control circuit is configured to operably enable the primary side switching signal according to a third waveform characteristic of the DCM resonance waveform, so as to prevent the primary side switch and the secondary side switch from being both conductive simultaneously, wherein an occurrence time point of the third waveform characteristic occurs later than an occurrence time point of the second waveform characteristic in the present switching period.

2. The switching controller circuit of claim 1, wherein the DCM resonance waveform corresponds to a resonance waveform of a drain-source voltage of the primary side switch, wherein the second waveform characteristic corresponds to a V-th valley of the DCM resonance waveform, whereas, the third waveform characteristic corresponds to a W-th valley of the DCM resonance waveform, wherein both V and W are integers and W is greater than V.

3. The switching controller circuit of claim 1, wherein in a case where the output power or the output current of the output power increases in comparison to the steady state, during the present switching period, the primary side control circuit is configured to operably disable the primary side switching signal during an inhibition interval, so that the primary side switching signal and the ZVS pulse do not overlap with each other during the inhibition interval, thereby preventing the primary side switch and secondary side switch from being both conductive simultaneously;

wherein the inhibition interval is correlated with a rising edge of the primary side switching signal within a previous switching period and a resonance period of the DCM resonance waveform.

4. The switching controller circuit of claim 3, wherein the resonance period of the DCM resonance waveform is correlated to an inductance of the primary winding and a stray capacitance of the primary side switch.

5. The switching controller circuit of claim 3, wherein the primary side control circuit is configured to operably generate an ON control signal according to the output power, so as to trigger the primary side switching signal and determine a turned-ON time point and an ON period of the primary side switch during each switching period, wherein the primary side control circuit is configured to operably generate a pre-inhibition signal indicative of a pre-inhibition interval during each switching period;

wherein when the ON control signal becomes enabled during the pre-inhibition interval, the primary side control circuit is configured to operably generate an inhibition signal indicative of the inhibition interval, so as to mask the ON control signal during the inhibition interval, thereby disabling triggering the primary side switching signal;

wherein the pre-inhibition signal is generated according to the rising edge of the primary side switching signal within the previous switching period and the resonance period of the DCM resonance waveform, and wherein the pre-inhibition interval covers at least the ZVS pulse of the previous switching period.

6. The switching controller circuit of claim 5, wherein when the ON control signal becomes enabled beyond the pre-inhibition interval, the ON control signal is allowed to trigger the primary side switching signal.

7. The switching controller circuit of claim 3, wherein after the inhibition signal is enabled, the switching controller circuit counts time of the inhibition interval according to a resonance synchronization signal correlated with the corresponding resonance period, such that the inhibition interval lasts for at least one resonance period.

8. The switching controller circuit of claim 7, wherein after the inhibition signal is enabled, the switching controller circuit counts time of the inhibition interval according to a signal related to the resonance period, such that after the inhibition interval ends, the primary side switching signal is enabled at a time point when the third waveform characteristic of the DCM resonance waveform occurs, thus achieving zero voltage switching, wherein the occurrence time point of the third waveform characteristic is later than an occurrence time point of the second waveform characteristic.

9. The switching controller circuit of claim 7, wherein when the inhibition signal is enabled, during the present switching period, an enablement time point of the primary side switching signal is distant from the ZVS pulse by one and half resonance periods.

10. The switching controller circuit of claim 5, wherein the primary side control circuit includes:
a ramp signal generation circuit, which is configured to operably start generating a baseline ramp signal at a knee point of the primary side switching signal during the switching period;
a valley selection circuit, which is configured to operably sample and hold the baseline ramp signal at the rising edge of the primary side switching signal, so as to generate a valley memory signal, and is configured to operably generate a first ramp signal and a second ramp signal, wherein a first offset level lies between the first ramp signal and the baseline ramp signal, whereas, a second offset level lies between the second ramp signal and the baseline ramp signal; and
an inhibition signal generation circuit, which is configured to operably compare the first ramp signal with the baseline ramp signal and compare the second ramp signal with the baseline ramp signal, so as to generate the pre-inhibition signal; wherein the pre-inhibition interval corresponds to a period wherein the baseline ramp signal lies between the first ramp signal and the second ramp signal, and wherein the pre-inhibition interval is configured to operably determine whether an occurrence time point of a rising edge of the ON control signal is within the pre-inhibition interval, so as to generate the inhibition signal.

11. The switching controller circuit of claim 10, wherein both the first offset level and the second offset level are correlated with the resonance period.

12. The switching controller circuit of claim 10, wherein the primary side control circuit further includes:
a resonance detection circuit, which is configured to operably generate a resonance synchronization signal correlated with the resonance period according to an auxiliary signal generated by an auxiliary winding of the power transformer;

wherein the inhibition signal generation circuit is further configured to operably count time of the inhibition interval according to the resonance synchronization signal, such that the inhibition interval lasts for at least one resonance period.

13. A flyback converter, which is configured to operably convert an input power to an output power, the flyback converter comprising:

a power transformer, which is coupled between the input power and the output power;

a primary side switch, which is configured to operably control a primary winding of the power transformer;

a secondary side switch, which is configured to operably control a secondary winding of the power transformer;

a primary side control circuit, which is configured to operably generate a primary side switching signal for controlling the primary side switch during a switching period; and a secondary side control circuit, which is configured to operably generate a secondary side switching signal for controlling a secondary side switch, wherein the secondary side switching signal has a synchronous rectifying (SR) pulse and a zero voltage switching (ZVS) pulse, wherein the SR pulse is configured to operably control the secondary side switch to be conductive for a SR period, so as to achieve synchronous rectification at a secondary side of the power transformer, and wherein the ZVS pulse is configured to operably control the secondary side switch to be conductive for a ZVS period, so as to cause the primary side switch to achieve zero voltage switching;

wherein in a steady state, the secondary side control circuit is configured to operably enable the ZVS pulse according to a first waveform characteristic of a discontinuous conduction mode (DCM) resonance waveform, whereas, the primary side control circuit is configured to operably enable the primary side switching signal according to a second waveform characteristic of the DCM resonance waveform, wherein the second waveform characteristic of the DCM resonance waveform occurs later than the first waveform characteristic of the DCM resonance waveform;

wherein in a case where the output power or an output current of the output power increases in comparison to the steady state, during a present switching period, the primary side control circuit is configured to operably enable the primary side switching signal according to a third waveform characteristic of the DCM resonance waveform, so as to prevent the primary side switch and the secondary side switch from being both conductive simultaneously, wherein an occurrence time point of the third waveform characteristic occurs later than an occurrence time point of the second waveform characteristic in the present switching period.

14. The flyback converter of claim 13, wherein the DCM resonance waveform corresponds to a resonance waveform of a drain-source voltage of the primary side switch, wherein the second waveform characteristic corresponds to a V-th valley of the DCM resonance waveform, whereas, the third waveform characteristic corresponds to a W-th valley of the DCM resonance waveform, wherein both V and W are integers and W is greater than V.

15. The flyback converter of claim 13, wherein in a case where the output power or the output current of the output power increases in comparison to the steady state, during the present switching period, the primary side control circuit is configured to operably disable the primary side switching signal during an inhibition interval, so that the primary side switching signal and the ZVS pulse do not overlap with each other during the inhibition interval, thereby preventing the primary side switch and secondary side switch from being both conductive simultaneously;

wherein the inhibition interval is correlated with a rising edge of the primary side switching signal within a previous switching period and a resonance period of the DCM resonance waveform.

16. The flyback converter of claim 15, wherein the resonance period of the DCM resonance waveform is correlated to an inductance of the primary winding and a stray capacitance of the primary side switch.

17. The flyback converter of claim 15, wherein the primary side control circuit is configured to operably generate an ON control signal according to the output power, so as to trigger the primary side switching signal and determine a turned-ON time point and an ON period of the primary side switch during each switching period, wherein the primary side control circuit is configured to operably generate a pre-inhibition signal indicative of a pre-inhibition interval during each switching period;

wherein when the ON control signal becomes enabled during the pre-inhibition interval, the primary side control circuit is configured to operably generate an inhibition signal indicative of the inhibition interval, so as to mask the ON control signal during the inhibition interval, thereby disabling triggering the primary side switching signal;

wherein the pre-inhibition signal is generated according to the rising edge of the primary side switching signal within the previous switching period and the resonance period of the DCM resonance waveform, and wherein the pre-inhibition interval covers at least the ZVS pulse of the previous switching period.

18. The flyback converter of claim 17, wherein when the ON control signal becomes enabled beyond the pre-inhibition interval, the ON control signal is allowed to trigger the primary side switching signal.

19. The flyback converter of claim 15, wherein after the inhibition signal is enabled, the flyback converter counts time of the inhibition interval according to a resonance synchronization signal correlated with the corresponding resonance period, such that the inhibition interval lasts for at least one resonance period.

20. The flyback converter of claim 19, wherein after the inhibition signal is enabled, the flyback converter counts time of the inhibition interval according to a signal related to the resonance period, such that after the inhibition interval ends, the primary side switching signal is enabled at a time point when the third waveform characteristic of the DCM resonance waveform occurs, thus achieving zero voltage switching, wherein the occurrence time point of the third waveform characteristic is later than an occurrence time point of the second waveform characteristic.

21. A control method configured to operably control a flyback converter, so as to convert an input power to an output power, wherein the flyback converter includes: a power transformer, which is coupled between the input power and the output power; a primary side switch, which is configured to operably control a primary winding of the power transformer; and a secondary side switch, which is configured to operably control a secondary winding of the power transformer; the control method comprising:

generating a primary side switching signal for controlling the primary side switch during a switching period; and generating a secondary side switching signal for controlling a secondary side switch, wherein the secondary side switching signal has a synchronous rectifying (SR) pulse and a zero voltage switching (ZVS) pulse, wherein the SR pulse is configured to operably control the secondary side switch to be conductive for a SR period, so as to achieve synchronous rectification at a secondary side of the power transformer, and wherein the ZVS pulse is configured to operably control the secondary side switch to be conductive for a ZVS period, so as to cause the primary side switch to achieve zero voltage switching;

wherein in a steady state, the step of generating the ZVS pulse includes a following step:

enabling the ZVS pulse according to a first waveform characteristic of a discontinuous conduction mode (DCM) resonance waveform;

wherein in the steady state, the step of generating the primary side switching signal includes following steps:

enabling the primary side switching signal according to a second waveform characteristic of the DCM resonance waveform, wherein the second waveform characteristic of the DCM resonance waveform occurs later than the first waveform characteristic of the DCM resonance waveform; and in a case where an output power or an output current of the output power increases in comparison to the steady state, during a present switching period, enabling the primary side switching signal according to a third waveform characteristic of the DCM resonance waveform, so as to prevent the primary side switch and the secondary side switch from being both conductive simultaneously, wherein an occurrence time point of the third waveform characteristic occurs later than an occurrence time point of the second waveform characteristic in the present switching period.

22. The control method of claim 21, wherein the DCM resonance waveform corresponds to a resonance waveform of a drain-source voltage of the primary side switch, wherein the second waveform characteristic corresponds to a V-th valley of the DCM resonance waveform, whereas, the third waveform characteristic corresponds to a W-th valley of the DCM resonance waveform, wherein both V and W are integers and W is greater than V.

23. The control method of claim 21, wherein in a case where the output power or the output current of the output power increases in comparison to the steady state, during the present switching period, the primary side control circuit is configured to operably disable the primary side switching signal during an inhibition interval, so that the primary side switching signal and the ZVS pulse do not overlap with each other during the inhibition interval, thereby preventing the primary side switch and secondary side switch from being both conductive simultaneously;

wherein the inhibition interval is correlated with a rising edge of the primary side switching signal within a previous switching period and a resonance period of the DCM resonance waveform.

24. The control method of claim 23, wherein the resonance period of the DCM resonance waveform is correlated to an inductance of the primary winding and a stray capacitance of the primary side switch.

25. The control method of claim 23, wherein the step of generating the primary side switching signal further includes following steps:

generating an ON control signal according to the output power, so as to trigger the primary side switching signal and determine a turned-ON time point and an ON period of the primary side switch during each switching period;

generating a pre-inhibition signal indicative of a pre-inhibition interval during each switching period;

when the ON control signal becomes enabled during the pre-inhibition interval, generating an inhibition signal indicative of the inhibition interval, so as to mask the ON control signal during the inhibition interval, thereby disabling triggering the primary side switching signal;

wherein the pre-inhibition signal is generated according to the rising edge of the primary side switching signal within the previous switching period and the resonance period of the DCM resonance waveform, and wherein the pre-inhibition interval covers at least the ZVS pulse of the previous switching period.

26. The control method of claim 25, wherein the step of generating the primary side switching signal further includes a following step:

when the ON control signal becomes enabled beyond the pre-inhibition interval, the ON control signal is allowed to trigger the primary side switching signal.

27. The control method of claim 23, wherein the step of generating the primary side switching signal further includes a following step:

after the inhibition signal is enabled, counting time of the inhibition interval according to a resonance synchronization signal correlated with the resonance period, such that the inhibition interval lasts for at least one resonance period.

28. The control method of claim 27, wherein the step of generating the primary side switching signal further includes a following step:

after the inhibition signal is enabled, counting time of the inhibition interval according to a signal related to the resonance period, such that after the inhibition interval ends, the primary side switching signal is enabled at a time point when the third waveform characteristic of the DCM resonance waveform occurs, thus achieving zero voltage switching, wherein the occurrence time point of the third waveform characteristic is later than an occurrence time point of the second waveform characteristic.

29. The control method of claim 25, wherein the step of generating the inhibition signal further includes following steps:

starting generating a baseline ramp signal at a knee point of the primary side switching signal during the switching period;

sampling and holding the baseline ramp signal at the rising edge of the primary side switching signal, so as to generate a valley memory signal;

generating a first ramp signal and a second ramp signal, wherein a first offset level lies between the first ramp signal and the baseline ramp signal, whereas, a second offset level lies between the second ramp signal and the baseline ramp signal;

comparing the first ramp signal with the baseline ramp signal and comparing the second ramp signal with the baseline ramp signal, so as to generate the pre-inhibition signal; wherein the pre-inhibition interval corresponds to a period wherein the baseline ramp signal lies between the first ramp signal and the second ramp signal; and determining whether an occurrence time point of a rising edge of the ON control signal is within the pre-inhibition interval, so as to generate the inhibition signal.

30. The control method of claim 29, wherein both the first offset level and the second offset level are correlated with the resonance period.

\* \* \* \* \*